United States Patent Office 3,476,976
Patented Nov. 4, 1969

3,476,976
STARTING DEVICE FOR DISCHARGE LAMP
Hiroshi Morita, Motoyosi Fuse, Sadaya Iwasaki, Hisato Yamagishi, Syojiro Kawaguchi, and Koichiro Tanigawa, Kadoma-shi, Osaka, Japan, assignors to Matsushita Denko Kabushiki Kaisha, Osaka, Japan, a corporation of Japan
Filed Apr. 7, 1967, Ser. No. 629,127
Claims priority, application Japan, Apr. 9, 1966, 41/22,556; Apr. 22, 1966, 41/25,746, 41/25,748; Dec. 29, 1966, 42/622
Int. Cl. H05b 39/02, 41/14
U.S. Cl. 315—101          7 Claims

ABSTRACT OF THE DISCLOSURE

This invention relates to a starting device for a discharge lamp wherein is provided a two-terminal starting pulse generating circuit provided with a closed circuit formed of such symmetrical switching element as a five-layer diode, a condenser and a primary winding of a pulse transformer and with a secondary winding electromagnetically coupled with the primary winding of said pulse transformer so that the generation of starting pulses and the feed of a filament preheating current take place at a frequency of a half cycle corresponding to a source voltage.

---

This invention relates to a starting device for a discharge lamp wherein is used a multilayer semiconductor or specifically a semiconductor having characteristics of an NPNPN 5-layer diode (symmetrical switching element) or its equivalent.

Generally, the starting voltage of a discharge lamp is sufficiently higher than the discharge voltage that it is necessary to provide some discharge starting accelerating means. As is well known, in the case of a fluorescent lamp, if electrodes are heated to effect a sufficient electron emission, a discharge will become possible with a comparatively low voltage. Therefore, heating the filaments of both electrodes by making a preheating current flow to the filaments prior to starting the fluorescent lamp is a method effective to facilitate the starting of the lamp. A glow tube has been suggested for this purpose, and a manual starting method and a bimetal starting method have been based on the same starting principle. Each of them requires a mechanical operation in which the filaments of a fluorescent lamp are preheated when the contacts are closed and the kick voltage of a ballast (choke ballast) generated by the current variation upon opening of the contacts is superimposed on the current to start the fluorescent lamp. In such starting method, with the deterioration of the glow tube or the contact opening and closing mechanism, a stable operation will gradually become difficult, the repetition of lighting and extinguishing of the lamp or the opening of the contacts will become impossible, and thus the filaments of the fluorescent lamp will be only heated and the life of the lamp will be remarkably shortened. Thus there have been difficulties in the maintainance of lamps using such starting devices. Further, as the preheating of the filaments is required for the starting, in the glow tube and bimetal starting methods, a delay will be produced by the heat response of the contact mechanism, and the opening and closing of the contacts will be repeated due to the failure of starting. Therefore, there have been defects in that the time required for starting is long and that blinks of light are produced at the time of starting.

Besides these starting methods accompanied with mechanical operations, there is a rapid starting method wherein both filaments of a fluorescent lamp are always kept heated and a high voltage required for starting is impressed on both electrodes. However, this method has a defect in that, as the filaments are always kept heated, the life of the cathode will become short. Therefore, in order to eliminate this defect, a lamp of triple coil filaments different from the filament structure of a general preheated type lamp is used and, in order to improve the startability, it is necessary to arrange a conductor closely to a lamp or to use a lamp having a conductor piece.

Further, in a rapid lighting type, as a leakage transformer is used to elevate a cold cathode to a dischargeable state without preheating the cathode, there is an advantage that there is no delay of the starting time. However, the discharge starting voltage is so high that the voltage of the transformer will be much higher than the terminal voltage while the lamp is lighted; therefore the power factor will be low and, even if it is corrected, the efficiency as a whole will not be so high. The same can be said also of a nonpreheated type lamp such as, for example, a sodium vapour lamp or a mercury lamp.

The present invention is suggested to improve such defects of conventional starting devices for discharge lamps as are described above and is to simply eliminate the conventional defects by alternately supplying a discharge lamp a preheating current and a starting pulse train more particularly, the electrodes are connected to an independent starting pulse generating device generating a plurality of high voltage pulses in a fixed phase of each half cycle of an alternating voltage source by utilizing the electric characteristics of a symmetrical switching element such as a 5-layer diode.

An object of the present invention is to provide a starting device wherein no such blink of lamp light occurs at the time of starting, as in the case of using a glow tube, and no excess heating of filaments due to the inability of contacts to open will occur, and the time required for lighting can be greatly reduced.

Another object of the present invention is to provide a starting device wherein the life of the semiconductor is so long that such replacement of faulty parts as in a glow tube is not required and the maintenance is very easy.

A further object of the present invention is to provide starting device wherein a rapid starting can be achieved without requiring an auxiliary lamp having a starting conductor.

Another object of the present invention is to provide a very economical starting device wherein an independent starting pulse generating device is provided, therefore the output voltage of a leakage transformer or the like used generally in a lighting circuit may well be of a magnitude with which the discharge lamp to be used can normally continue to be lighted, the ratio of the secondary no load voltage to the lighted lamp voltage can be made small and therefore the transformer formation can be made small.

The present invention shall now be explained with reference to the drawings.

Figure 1:
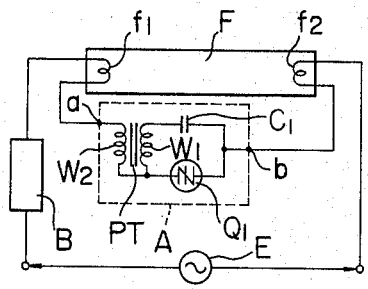
FIG. 1 shows the most fundamental circuit formation of a starting device of the present invention.

In FIG. 1, F is a preheated type fluorescent discharge lamp, $f_1$ and $f_2$ are filaments of said fluorescent discharge lamp, E is an alternating current source voltage, PT is a pulse transformer having primary winding $w_1$ and secondary winding $w_2$, $C_1$ is a condenser, $Q_1$ is a 5-layer diode and A is a two-terminal starting pulse generating device. A closed circuit is formed of the primary winding $w_1$ of the pulse transformer, the condenser $C_1$ and the 5-layer diode $Q_1$. The point connecting the condenser $C_1$ and 5-layer diode $Q_1$ is made a terminal $b$. The secondary winding $w_2$ of the pulse transformer is connected at one end with the primary winding $w_1$ and 5-layer diode $Q_1$ and is made a terminal $a$ at the other end. B is a lighting current ballast element. The alternating current source voltage E is applied to the lighting current ballast element B-filament $f_1$-terminal $a$-terminal $b$-filament $f_2$.

Figure 12:
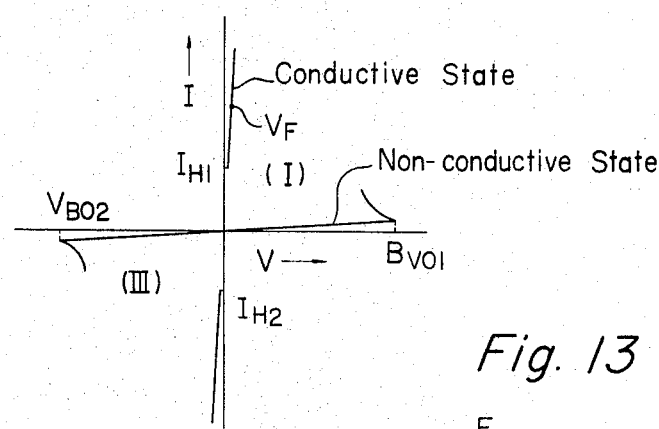
FIG. 12 is an electric characteristic diagram of an NPNPN 5-layer diode.

The 5-layer diode $Q_1$ has such electric characteristics as are shown in FIG. 12. In case the critical rising velocity ($dV/dt$) of the terminal voltage of the 5-layer diode is high and the terminal voltage is higher than the breakover voltage $V_{Bo}$ that is to say avalanche voltage, the 5-layer diode $Q_1$ will convert to a low impedance state (conducting state) from a high impedance state (nonconducting state) and the voltage drop $V_F$ in such case will be so slight as to be usually less than 1 volt.

Once in a conducting state, even if the terminal voltage becomes lower, the conducting state will continue. But, when the current becomes lower than the holding current $I_H$ of the 5-layer diode $Q_1$, the diode will quickly return to the high impedance state (nonconducting state) from the low impedance state (conducting state). This 5-layer diode may be in a conducting state in both directions and has substantially the same electric characteristics in the first and third quadrants. In the drawing, $V_{Bo1}$ and $I_{H1}$ represent a breakover voltage and a holding current belonging to the first quadrant, respectively, and $V_{Bo2}$ and $I_{H2}$ represent a breakover voltage and a holding current belonging to the third quadrant, respectively. Further, as a symmetrical switching element having such electric characteristics can be used not only a 5-layer diode but also any other semiconductor or a combination of a plurality of semiconductors as, for example, of two N-P-N-P 4-layer diodes used in a back to back connection.

The operation shall be described in the following.

In the device in FIG. 1, when the preheated type fluorescent discharge lamp F does not discharge if the alternating current voltage source E will impress a voltage in series with the ballast element B, filament $f_1$, secondary winding $w_2$ and primary winding $w_1$ of the pulse transformer, condenser $C_1$ and filament $f_2$ and the condenser $C_1$ will be charged. The impedance of the primary winding $w_1$ for the commercial frequency is so low that, in fact, the terminal voltage of the condenser $C_1$ is considered to be equal to the terminal voltage of the 5-layer diode $Q_1$. When the condenser $C_1$ is charged until its terminal voltage reaches the breakover voltage $V_{Bo1}$ of the 5-layer diode $Q_1$, said diode $Q_1$ will ignite and be in conductive state.

When the 5-layer diode $Q_1$ ignites and conducts, the rise of the current fed from the alternating current source E through the ballast B, filaments $f_1$ and $f_2$ and the secondary winding $w_2$ will lag due to the ballast B and will be generally so slow that no current sufficient to continue the conducting state of the 5-layer diode $Q_1$ will be given. Therefore, with the decrease of the discharge current of the condenser $C_1$, the diode will return to the nonconducting state, the charge of the condenser $C_1$ will be resumed and such operation as is described above will be repeated. Such operation will be continued until a phase angle $Q_2$ (see FIG. 13) at which a current fed at the time of the conduction of the 5-layer diode $Q_1$ becomes larger than the holding current $I_H$ of the 5-layer diode $Q_1$. After the phase angle $\theta_2$ at which a current which can maintain the conducting state of the 5-layer diode $Q_1$ is fed, a closed circuit of the ballast B, filament $f_2$, secondary winding $w_2$ of the pulse transformer, 5-layer diode $Q_1$ in the conducting state, filament $f_1$ and alternating current source E will be completed and a heating current will flow to the filaments $f_1$ and $f_2$.

Figure 13:
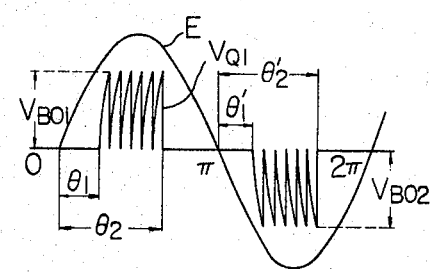
FIG. 13 is a view for explaining the operation of the fundamental embodiment.

The heating current for this preheating will gradually decrease with the time variation of the electric source voltage E until a phase angle $\theta_1'$ (see FIG. 13) at which the current becomes smaller than the holding current $I_{H1}$ of the 5-layer diode $Q_1$, then the 5-layer diode $Q_1$ will return to the nonconducting state. The phase angle $\theta_1'$ at which the 5-layer diode $Q_1$ returns to the nonconducting state due to the decrease of the preheating current will be in the reverse voltage period (that is, in the next half cycle) of the alternating current source voltage E because the preheating current delays more than the electric source voltage E due to the effective inductance of the ballast or the like as shown in FIG. 13. When the 5-layer diode $Q_1$ returns to the nonconducting state, a series circuit of the above described ballast B, filament $f_2$, secondary winding $w_2$ and primary winding $w_1$ of the pulse transformer PT, condenser $C_1$ and filament $f_1$ will be formed for the current source E. Therefore, the condenser $C_1$ is charged in the reverse direction, when the terminal voltage reaches the breakover voltage $V_{Bo2}$ in the reverse direction of the 5-layer diode $Q_1$ said 5-layer diode will be in conductive state and will operate in the same manner as is described above and a current larger than the holding current of the 5-layer diode $Q_1$ will be fed. If this phase angle is $Q_2'$, until the phase angle $Q'$, the 5-layer diode $Q_1$ will repeat the nonconducting and conducting states. And the 5-layer diode $Q_1$ will again form a passage to the filaments $f_1$ and $f_2$ from the phase angle $\theta_2'$ at which a current larger than the holding current $I_{H2}$ is given and will heat the filaments $f_1$ and $f_2$. The heating of the filaments $f_1$ and $f_2$ will be continued until the preheating current reduces to be smaller than the holding current $I_{H2}$ of the 5-layer diode $Q_1$. (See FIG. 13). Such operation is repeated in each cycle. As the electric characteristics of the 5-layer diode $Q_1$ are substantially symmetrical in both normal direction and reverse direction, the period of repeating the conduction and nonconduction of the above described 5-layer diode $Q_1$ and the period of preheating the filaments $f_1$ and $f_2$ will become respectively substantially equal in both positive half cycle and negative half cycle and will be respectively $$\theta_2 - \theta_1 \approx \theta_2' - \theta_1'$$
$$\pi + \theta_1' - \theta_2 \approx \pi + \theta_1' - \theta_2'$$

Figure 14:
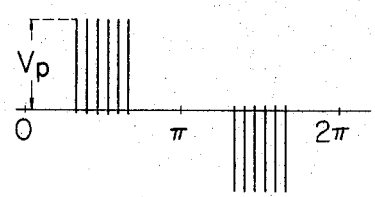
FIG. 14 is a wave form diagram showing starting pulses.

The electric charge of the condenser $C_1$ carried out except during the period in which the preheating current is flowing into the filaments $f_1$ and $f_2$ will be discharged through the primary winding $w_1$ of the pulse transformer PT. Due to its steep discharge current, pulses $V_p$ of a high peak value will be generated in the secondary winding $w_2$ of the pulse transformer PT. As the pulse $V_p$ will be generated in reponse to the repetition of the nonconduction and conduction of the 5-layer diode $Q_1$, such pulse train as is shown in FIG. 14 will be obtained in the secondary winding $w_2$ of the pulse transformer PT and such pulses will be applied to one end of each of the preheated filaments $f_1$ and $f_2$ of the fluorescent discharge lamp through the 5-layer diode in the conductive state (while the condenser $C_1$ is discharging) and will contribute to the start of the discharge lamp F.

That is to say, according to the present invention, in starting the preheated type fluorescent lamp F, the heating of the filaments $f_1$ and $f_2$ and the generation of the high voltage pulse train for starting the fluorescent discharge lamp F will be carried out alternately at a frequency of a half cycle of the source voltage E and, therefore, with the progress of the preheating of the fluorescent discharge lamp, the lamp will very smoothly start.

Figure 15:
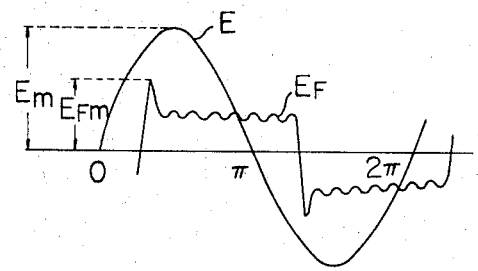
FIG. 15 is a wave form diagram showing the tube voltage of the lighted lamp of the fundamental embodiment to the cycle of the source voltage.

So that a stable lighting may be maintained and continued by the start of the fluorescent discharge lamp, it is necessary for the 5-layer diode $Q_1$ to keep a stationary state while the discharge lamp is lighted. Therefore, as the discharge lamp terminal voltage $E_F$ will generally reduce to the discharge maintaining voltage as shown in FIG. 15 while the discharge lamp F is lighted, the breakover voltage ($V_{BO1} \approx V_{BO2}$) of the 5-layer diode is selected to be between the maximum value $E_{Fm}$ of the lighted discharge lamp terminal voltage $E_F$ and the maximum value $E_m$ of the source voltage.

According to the results of experiments, using a preheated type fluorescent lamp of a tube diameter of 38 mm. and a tube length of 630 mm., $C_1=0.05\mu F_1$, $Q_1(V_{BO1} \approx V_{BO2} \approx 110$ v.), a pulse transformer PT of a winding ratio of 1:5, a choke ballast as a current ballast element B and a current of 60 c./s. and 100 v., the pulse generating period was about 1.5 ms./half cycle (the conducting period of the 5-layer diode was about 6.8 ms.), a preheating current of about 800 ma. was obtained, the discharge lamp produced no blink after the electric source was switched on, a very soft starting state was shown and the time required for the starting was about 1 to 2 seconds.

FIG. 2 to 6 show embodiments in which an additional circuit is connected in series with the starting pulse generating circuit A of the fundamental circuit in FIG. 1.

Figure 2:
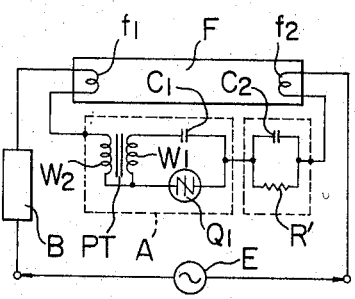
FIGS. 2 to 6 show embodiments in which an additional circuit is provided in a pulse generating starting circuit.

In FIG. 2, a parallel circuit of a resistance element R' and a condenser $C_2$ is used for the additional circuit and is connected in series with the starting pulse generating circuit A so as to form a two-terminal starting circuit. By inserting the resistance element R' in the starting pulse generating circuit A, the preheating current and the number of generated pulses can be controlled. However, there is a defect that, in case a large value is required for the resistance element R' in the operation, the high voltage pulse applied to the discharge lamp will reduce and therefore the effective start will be impaired. In order to eliminate such defect, a bias condenser $C_2$ is added in parallel with the resistance R', so that the discharge lamp can be effectively started without the reduction of the high voltage pulses. Further, in case the resistance R' is taken to be large, while the discharge lamp is lighted, the lamp voltage will be borne by the condenser $C_1$ and the parallel circuit of said resistance R' and condenser $C_2$, the voltage borne by the 5-layer diode $Q_1$ will substantially fall and therefore the range of the breakover voltages of the 5-layer diode $Q_1$ can be made wider.

Figure 3:
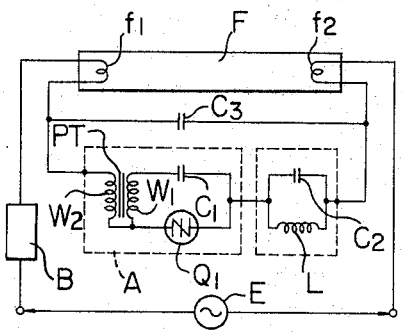

In FIG. 3, a parallel circuit of an inductance element L and a condenser $C_2$ is used for the additional circuit and is connected in series with the starting pulse generating circuit A so as to form a two-terminal starting circuit. In this case, the inductance element L will act as a current limiting element and will adjust the preheating current and the condenser $C_2$ will act for a bypass for starting pulses generated in the secondary winding $w_2$ of the pulse transformer PT. A condenser $C_3$ is used for preventing noise. Furthermore the voltage borne by the 5-layer diode $Q_1$ while the lamp is lighted can be reduced and the range of the breakover voltage of the 5-layer diode $Q_1$ that can be used can be made wider. That is to say, when a parallel resonance circuit is formed of the inductance element L and condenser $C_2$, its resonance frequency is made substantially equal to the frequency corresponding to the maximum value $E_{Fm}$ of the tube voltage wave form shown while the discharge lamp is lighted and the combination of the condenser $C_2$ and the inductance element L is properly selected, the impedance of the parallel resonance circuit for the maximum value $E_{Fm}$ of the lamp voltage will remarkably increase, substantially all of the maximum voltage $E_{Fm}$ of the lamp will be borne by this parallel circuit, the voltage applied to the 5-layer diode $Q_1$ while the lamp is lighted will be able to be greatly reduced, therefore the 5-layer diode $Q_1$ will not reconduct while the lamp is lighted and therefore the continuation of the normal lighting will be able to be guaranteed.

Figure 4:
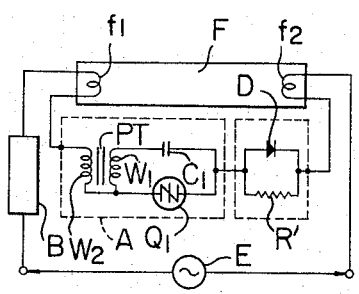

FIG. 4 shows a case in which a parallel circuit of a resistance element R' and a diode D is used for the additional circuit.

Figure 5:
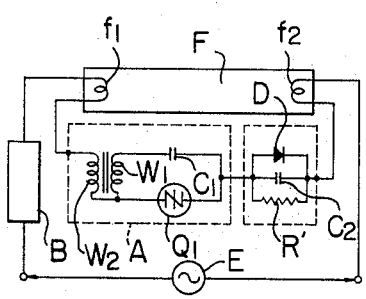

FIG. 5 shows a case in which a parallel circuit of a resistance element R', condenser $C_2$ and diode D is used for the additional circuit.

A preheated discharge lamp can be smoothly started by the cooperation of the preheating degree of the filaments and the magnitude of the starting pulse train. Specifically, in case the fundamental form of the starting pulse generating circuit A is used, when the preheating current is rather insufficient, the above mentioned two embodiments will be effective. That is to say, by the insertion of the diode D, the filaments will be heated as if with a direct current, the preheating current will be able to be made larger than in the case of heating it with an alternating current with the same ballast element B (specifically the choke ballast), the preheating will be carried out sufficiently and the discharge lamp will be able to be started with a small starting pulse train. Further, in such case, the frequency of the generation of the pulse train and the preheating for the starting will become twice as high as in the case of only the starting pulse generating circuit A and will correspond to 1 cycle of the source voltage. Further, the resistance R' will act for the adjustment to obtain the optimum pulse train generating period and the condenser $C_2$ will act to bias high voltage pulses.

Figure 6:
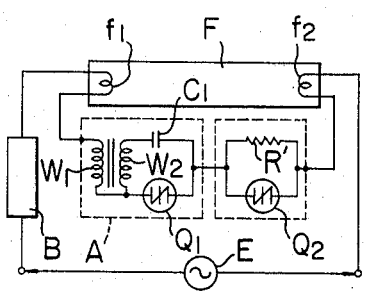

FIG. 6 shows a case in which a parallel circuit of a resistance element R' and another 5-layer diode $Q_2$ is used for the additional circuit and is connected in series with the starting pulse generating circuit A. Its objects are to reduce the voltage borne by the 5-layer diode $Q_1$ in the starting pulse generating circuit A while the lamp is illuminated without the reduction of the preheating current and to widen the allowable range of the breakover voltage of the 5-layer diode $Q_1$ that can be used. That is to say, by the conduction of the 5-layer diode $Q_1$, said diode $Q_1$ will show a very low impedance. In such case, the source voltage will be substantially borne by the resistance R'. If the breakover voltage of the 5-layer diode $Q_2$ in the additional circuit is selected to be lower than the breakover voltage of the 5-layer diode $Q_1$ in the starting pulse generating circuit, with the breakover of the 5-layer diode $Q_1$, the 5-layer diode $Q_2$ will also immediately come to be in the breakover conducting state. Therefore, the preheating current will flow from the 5-layer diode $Q_1$ to the 5-layer diode $Q_2$ and the preheating will be carried out normally.

Further while the fluorescent lamp is lighted, a series circuit of the condenser $C_1$ and resistance element R' will be formed in parallel with the discharge lamp. Therefore, the rise of the discharge lamp terminal voltage at the time of the reignition of the discharge lamp caused every half cycle will become larger, the degree of the disappearance of ions by the diffusion and reconnection at the time of igniting the discharge lamp will become lower and the discharge lamp will be reignited with a substantially lower voltage. This means that, in fact, the maximum value $E_{Fm}$ of the discharge lamp terminal voltage will become smaller. The voltage will be borne by the condenser $C_1$ and the resistance R' and therefore the terminal voltage of the 5-layer diode $Q_1$ connected equivalently in parallel with the condenser $C_1$ will be able to be greatly reduced. Thus the using range of the 5-layer diode $Q_1$ will expand and it will be very advantageous practically.

Further, it is needless to say that the lower limit of the breakover voltage of the 5-layer diode $Q_2$ in the additional circuit is higher than the terminal voltage generated in the resistance R' while the lamp is illuminated.

Figure 7:
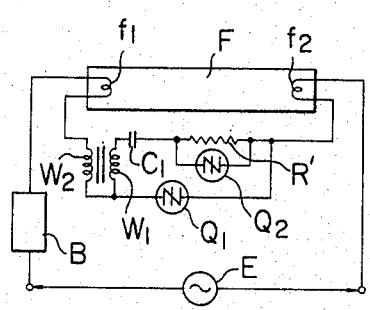
FIGS. 7 and 8 show other embodiments.

FIG. 7 is a modification of FIG. 6 and has the same effect as in the case of the above described FIG. 6. The required conditions of the breakover voltage of the other 5-layer diode $Q_2$ in FIG. 7 are also the same as in FIG. 6.

Figure 8:
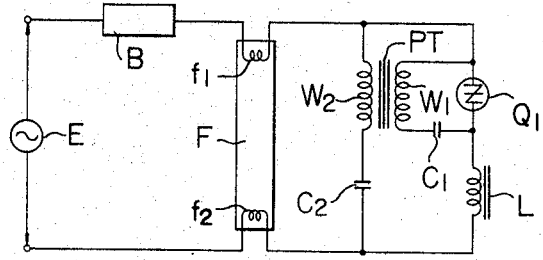

FIG. 8 shows another embodiment wherein a starting pulse generating circuit is formed of a 5-layer diode Q, condenser $C_1$ and primary winding $w_1$ and secondary winding $w_2$ of a pulse transformer PT. As described above, a high impedance element L for generated pulses is connected in series with this generating circuit. A bypass condenser $C_3$ is connected on one side to the secondary winding $w_2$ of the pulse transformer PT and on the other side to the high impedance element L. As described above, the two-terminal starting circuit is formed by the 5-layer diode $Q_1$, condenser $C_1$, winding $w_1$, $w_2$ of pulse transformer, bypass condenser $C_2$ and high impedance element L. The two-terminal starting circuit is connected on one side to the electric source through the filament $f_1$ and current ballast element B and on the other side to the electric source through the filament $f_2$.

The feature of this circuit is that the series circuit of the secondary winding $w_2$ of the pulse transformer PT and the condenser $C_3$ is connected in parallel with the series circuit of the pulse impeding element L and the primary closed circuit so that the starting pulses generated in the secondary winding $w_2$ of the pulse transformer PT may be led to the discharge lamp through the condenser $C_3$ and may start the discharge lamp. No preheating current for the preparation for lighting the discharge lamp will flow to either of the windings of the pulse transformer PT. Therefore, the pulse transformer can be made smaller.

Figure 9:
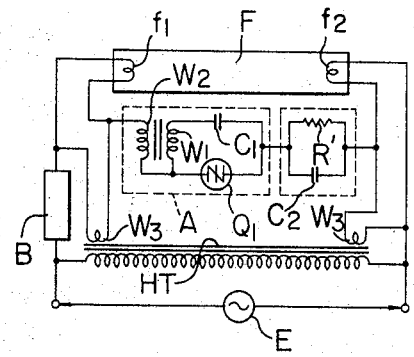
FIGS. 9 to 11 show discharging lamp starting devices having preheating transformers.
Figure 10:
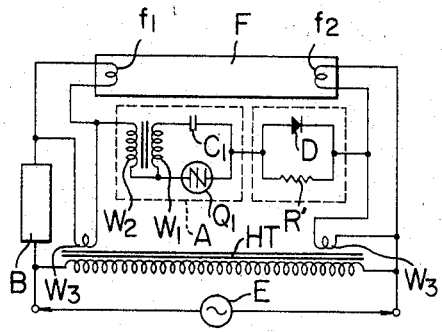
Figure 11:
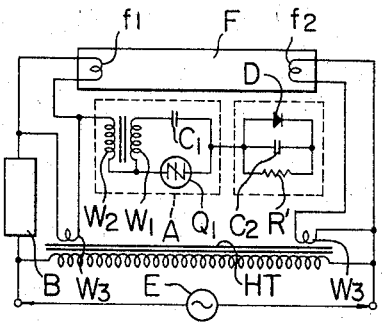

FIGS. 9 to 11 show embodiments of the discharge lamp starting device wherein the filaments of the discharge lamp are heated by a preheating transformer.

In FIG. 9, HT is a preheating transformer for the filaments and secondary windings $w_3$ are respectively connected to the filaments $f_1$ and $f_2$. Further, an additional circuit in which the condenser $C_2$ and resistance R' are connected in parallel is connected in series with the starting pulse generating circuit A shown in FIG. 2 and the filament $f_1$ is connected to the electric source through the current ballast element B.

FIG. 10 shows a circuit wherein a two-terminal starting circuit in which an additional circuit formed by connecting a resistance R' and a diode D in parallel is connected in series with the starting pulse generating circuit A shown in FIG. 4 is applied to a normally preheated type discharge lamp having a preheating transformer HT.

FIG. 11 shows a circuit wherein a two-terminal starting circuit in which an additional circuit formed by connecting a condenser $C_2$, resistance R' and diode D in parallel is inserted in series with the starting pulse generating circuit A shown in FIG. 5 is applied to a normally preheated type discharge lamp having a preheating transformer HT.

While there has been described in connection with the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A starting device for a discharge lamp having a pair of electrodes connected to a voltage source, a current ballast element connected between said discharge lamp and said voltage source, a two-terminal starting pulse generating circuit operatively connected to said electrodes and including a closed circuit comprising a symmetrical switching element, a condenser and a primary winding of a pulse transformer; a secondary winding of said pulse transformer electromagnetically coupled with said primary winding so as to alternately supply starting pulses and filament preheating current to said electrodes during alternate half cycles of the voltage source signal; and an additional circuit consisting of a parallel circuit of a resistance element and a condenser connected in series with said two-terminal starting pulse generating circuit.

2. A starting device for a discharge lamp having a pair of electrodes connected to a voltage source, a current ballast element connected between said discharge lamp and said voltage source, a two-terminal starting pulse generating circuit operatively connected to said electrodes and including a closed circuit comprising a symmetrical switching element, a condenser and a primary winding of a pulse transformer; a secondary winding of said pulse transformer electromagnetically coupled with said primary winding so as to alternately supply starting pulses and filament preheating current to said electrodes during alternate half cycles of the voltage source signal; and an additional circuit consisting of a parallel circuit of an inductance element and a condenser connected in series with said two-terminal starting pulse generating circuit.

3. A starting device for a discharge lamp having a pair of electrodes connected to a voltage source, a current ballast element connected between said discharge lamp and said voltage source, a two-terminal starting pulse generating circuit operatively connected to said electrodes and including a closed circuit comprising a symmetrical switching element, a condenser and a primary winding of a pulse transformer; a secondary winding of said pulse transformer electromagnetically coupled with said primary winding so as to alternately supply starting pulses and filament preheating current to said electrodes during alternate half cycles of the voltage source signal; and an additional circuit consisting of a parallel circuit of a diode and a resistance connected in series with said two-terminal starting pulse generating circuit.

4. A starting device for a discharge lamp having a pair of electrodes connected to a voltage source, a current ballast element connected between said discharge lamp and said voltage source, a two-terminal starting pulse generating circuit operatively connected to said electrodes and including a closed circuit comprising a symmetrical switching element, a condenser and a primary winding of a pulse transformer; a secondary winding of said pulse transformer electromagnetically coupled with said primary winding so as to alternately supply starting pulses and filament preheating current to said electrodes during alternate half cycles of the voltage source signal; and an additional circuit consisting of a parallel circuit of a resistance, a diode and a condenser connected in series with said two-terminal starting pulse generating circuit.

5. A starting device for a discharge lamp having a pair of electrodes connected to a voltage source, a current ballast element connected between said discharge lamp and said voltage source, a two-terminal starting pulse generating circuit operatively connected to said electrodes and including a closed circuit comprising a symmetrical switching element, a condenser and a primary winding of a pulse transformer; a secondary winding of said pulse transformer electromagnetically coupled with said primary winding so as to alternately supply starting pulses and filament preheating current to said electrodes during alternate half cycles of the voltage source signal; and an additional circuit consisting of a parallel circuit of a resistance and another symmetrical switching element connected in series with said two-terminal starting pulse generating circuit.

6. A starting device for a discharge lamp having a pair of electrodes connected to a voltage source, a current ballast element connected between said discharge lamp and said voltage source, a two-terminal starting pulse generating circuit operatively connected to said electrodes and including a closed circuit comprising a symmetrical switching element, a condenser and a primary winding of a pulse transformer; a secondary winding of said pulse transformer electromagnetically coupled with said primary winding so as to alternately supply starting pulses and filament preheating current to said electrodes during alternate half cycles of the voltage source signal; and an additional circuit in which another symmetrical switching element and a resistance element are connected in parallel, is connected in series with the condenser in said two-terminal starting pulse generating circuit.

7. A starting device for a discharge lamp having a pair of electrodes connected to a voltage source, a current ballast element connected between said discharge lamp and said voltage source, a two-terminal starting pulse generating circuit operatively connected to said electrodes and including a closed circuit comprising a symmetric switching element, a condenser and a primary winding of a pulse transformer; a secondary winding of said pulse transformer electromagnetically coupled with said primary winding so as to alternately supply starting pulses and filament preheating current to said electrodes during alternate half cycles of the voltage source signal; and an element giving a high impedance for pulses is connected in series with said closed circuit and a bypass condenser is connected in series with said secondary winding of said pulse transformer.

References Cited

UNITED STATES PATENTS

| | | | |
|---|---|---|---|
| 3,047,772 | 7/1962 | Kobayashi | 315—99 |
| 3,188,490 | 6/1965 | Hoff et al. | 315—194 X |
| 3,307,070 | 2/1967 | Hutson | 315—101 |
| 3,364,386 | 1/1968 | Segava et al. | 315—103 |

JAMES W. LAWRENCE, Primary Examiner

E. R. LA ROCHE, Assistant Examiner

U.S. Cl. X.R.

307—305; 315—105, 199